(12) United States Patent
Kozuka

(10) Patent No.: US 11,039,030 B2
(45) Date of Patent: Jun. 15, 2021

(54) IMAGE PRINTING APPARATUS AND METHOD FOR CONTROLLING IMAGE PRINTING APPARATUS

(71) Applicant: CANON KABUSHIKI KAISHA, Tokyo (JP)

(72) Inventor: Yasuhiro Kozuka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/426,998

(22) Filed: May 30, 2019

(65) Prior Publication Data

US 2019/0373128 A1 Dec. 5, 2019

(30) Foreign Application Priority Data

May 30, 2018 (JP) .............................. JP2018-103179

(51) Int. Cl.
*H04N 1/00* (2006.01)
*G06F 3/12* (2006.01)

(52) U.S. Cl.
CPC ....... *H04N 1/00896* (2013.01); *G06F 3/1221* (2013.01); *H04N 1/00214* (2013.01); *H04N 1/00233* (2013.01); *H04N 1/00928* (2013.01); *H04N 2201/0074* (2013.01)

(58) Field of Classification Search
CPC ........... H04N 1/00896; H04N 1/00214; H04N 1/00233; H04N 1/00928; H04N 2201/0074; G06F 3/1236; G06F 3/126

USPC ...... 358/1.14, 1.11–1.18; 713/300, 310, 320, 713/323, 324, 330, 340
See application file for complete search history.

(56) References Cited

U.S. PATENT DOCUMENTS

| | | | | |
|---|---|---|---|---|
| 2012/0262751 | A1* | 10/2012 | Inaba ................. | H04N 1/00928 358/1.14 |
| 2014/0293342 | A1* | 10/2014 | Tsutsumi ................ | G06F 3/126 358/1.15 |
| 2019/0325761 | A1* | 10/2019 | Ohno ................... | G08G 5/0013 |

FOREIGN PATENT DOCUMENTS

JP 2012222753 A 11/2012
JP 2017019195 A 1/2017

\* cited by examiner

*Primary Examiner* — Chad Dickerson
(74) *Attorney, Agent, or Firm* — Canon U.S.A., Inc., IP Division

(57) ABSTRACT

In order to prevent wasteful power consumption, in various embodiments, advance activation of a printer is avoided in the event of an attack on a particular port if the printer is used in a network environment with a low security strength. For example, according to one embodiment, while a GPIO signal for activating the printer in advance is generated in response to reception of print data, the GPIO assert setting is disabled if a network to which the printer is connected has a low security strength.

12 Claims, 13 Drawing Sheets

IMAGE PRINTING APPARATUS AND METHOD FOR CONTROLLING IMAGE PRINTING APPARATUS

BACKGROUND

Field

The present disclosure relates to a method for controlling an image printing apparatus in which data is received in a power-saving state from an external apparatus via a network.

Description of the Related Art

Conventionally, when an image printing apparatus is not in use for a certain period of time, power supply to a printer engine unit is stopped to shift the apparatus to a power-saving mode, so that power saving is achieved. Therefore, if the image printing apparatus receives a print job via a network, while in the power-saving mode, the apparatus requires a preparation period for warming a fuser in the printer engine unit and recovering other functions of the printer engine unit from the power-saving mode. This is a limiting factor on an FPOT (First Print Output Time), which is an important element of printing performance.

As a technique for achieving both short FPOT and power saving, Japanese Patent Application Laid-Open No. 2012-222753 proposes a function that allows a printer engine unit to be powered on in advance, without waiting for activation of a main CPU, if it is determined that a network port has received print data.

Incidentally, even if the received data is print data, the printer engine unit may not need to be immediately activated. For example, in some cases, a "reserved print mode" may be set. In the "reserved print mode," the received print data is reserved in the printing apparatus to be printed later when a user inputs an instruction to print the reserved print data.

In the "reserved print mode," the user may not necessarily come to the printing apparatus to pick up printed sheets immediately after the print data is received and the printer engine unit is activated. Therefore, immediate activation of the printer engine unit may result in wasting power.

In addition, Japanese Patent Application Laid-Open No. 2017-19195 proposes a controller function for preventing such an unnecessary activation operation of the printer engine unit as described above. With this function, if such reservation setting using a "reserved print mode" is enabled, the advance power-on function for the printer engine unit as proposed in Japanese Patent Application Laid-Open No. 2012-222753 can be turned off.

Further, in recent years, image forming apparatuses have increasingly been used in an environment where communications can be sent across different networks, such as the Internet and an intranet. Accordingly, there has been a growing need for an image printing apparatus having multiple network ports.

When an image printing apparatus is used in a network environment with a relatively low security strength that allows access by a large number of people, such as the Internet environment, a particular network port may be attacked by an unauthorized access.

In such a case where an image printing apparatus has multiple network ports, the technique in Japanese Patent Application Laid-Open No. 2012-222753 still powers on the engine unit in advance if it is determined from the network port number that print data is received. However, employing this configuration can cause the image printing apparatus to remain activated even though data that is not print data is received, resulting in wasteful power consumption.

SUMMARY

According to various embodiments of the present disclosure, an image forming apparatus is provided that comprises an image forming device that forms an image on a sheet, a network interface, and at least one controller. The controller is configured to perform operations comprising analyzing data obtained via the network interface and, based on a result of the analyzing, outputting an instruction to start power supply to the image forming device. The controller is further configured to set the network interface to a first mode if the network interface is connected to the Internet, and set the network interface to a second mode if the network interface is connected to an intranet. In the first mode, the instruction to start power supply to the image forming device is output, without intervention by the controller, in response to reception of data related to image forming, and, in the second mode, the instruction to start power supply to the image forming device is not output even if data related to image forming is received.

According to various embodiments of the present disclosure, if a network to which an image printing apparatus is connected has a low security strength, advance activation of a printer unit is avoided in the event of an attack on a particular port. This enables prevention of wasteful power consumption.

Further features of the present disclosure will become apparent from the following description of exemplary embodiments with reference to the attached drawings.

DESCRIPTION OF THE EMBODIMENTS

Various embodiments of the present disclosure will now be described in detail in accordance with the accompanying drawings.

First Embodiment

Figure 1:
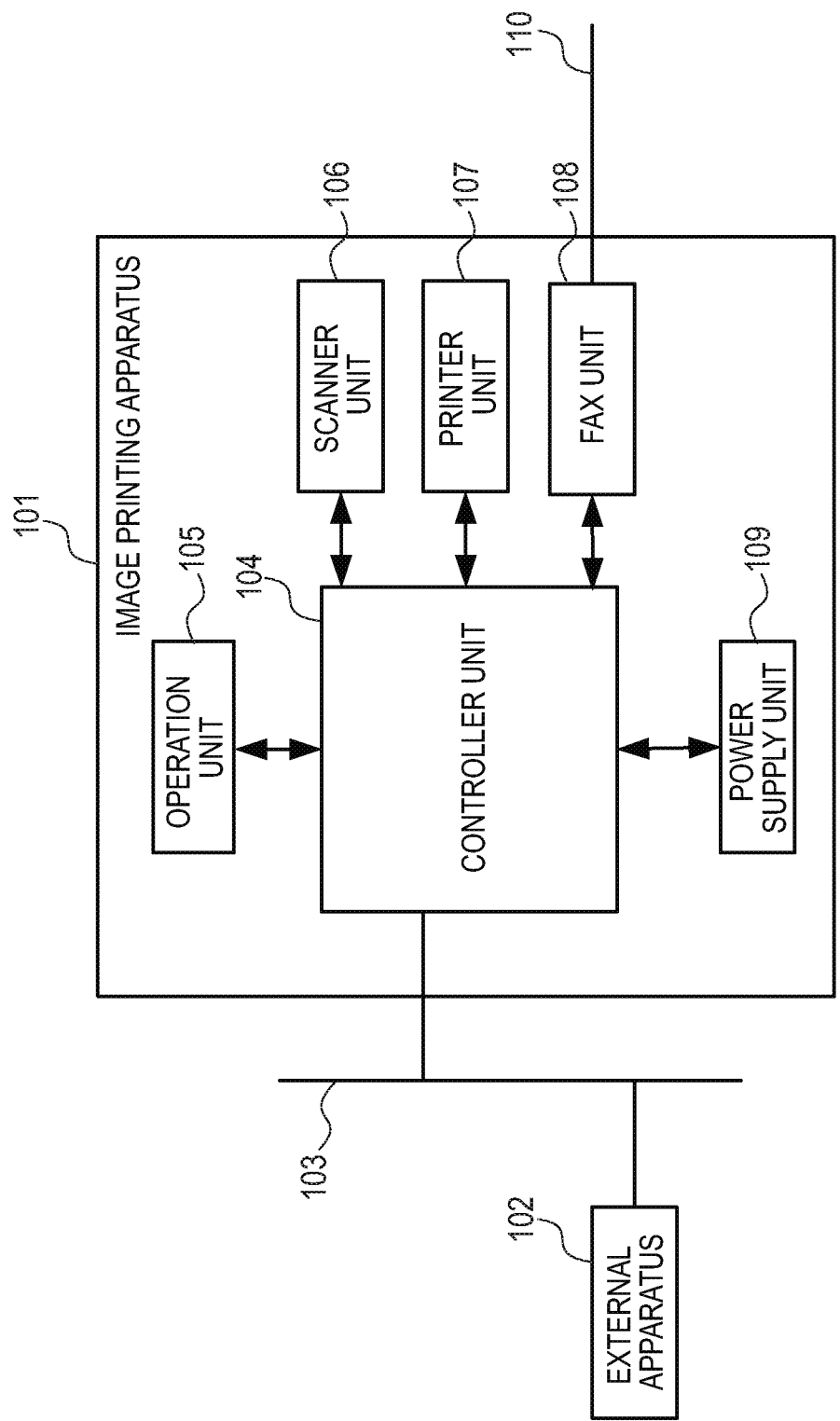
FIG. 1 is a diagram illustrating a configuration example of a printing system according to a first embodiment.

FIG. 1 illustrates a configuration example of a printing system in the first embodiment.

In FIG. 1, an image printing apparatus 101 is connected to an external apparatus 102 such as a PC via a network 103 and configured to transmit and receive data to and from the external apparatus 102. The image printing apparatus 101 has multiple functions, such as the functions of a copier, printer, scanner, and fax machine.

Now, the configuration overview and the operation of the image printing apparatus 101 will be described.

The image printing apparatus 101 includes a controller unit 104, an operation unit 105, a scanner unit 106, a printer unit 107, a fax unit 108 and a power supply unit 109.

The operation unit 105 includes switches and an operation panel for an operator to perform various operations, as well as a display unit for displaying the state of the image printing apparatus and operation information.

The scanner unit 106 includes a mechanism for scanning a document image, converting the image into digital data, and inputting the data to the controller unit 104.

The printer unit 107 outputs image data processed by the controller unit 104 by printing the processed image data onto a sheet.

The fax unit 108 is connected to a telephone line 110 and has a function of faxing a document read by the scanner unit 106. The fax unit 108 also has a function of outputting fax data received through the telephone line 110 by causing the printer unit 107 to print the received fax data.

The power supply unit 109 is a power supply for the image printing apparatus 101. The power supply unit 109 converts AC power into DC power and powers each unit in the image printing apparatus 101.

Figure 2:
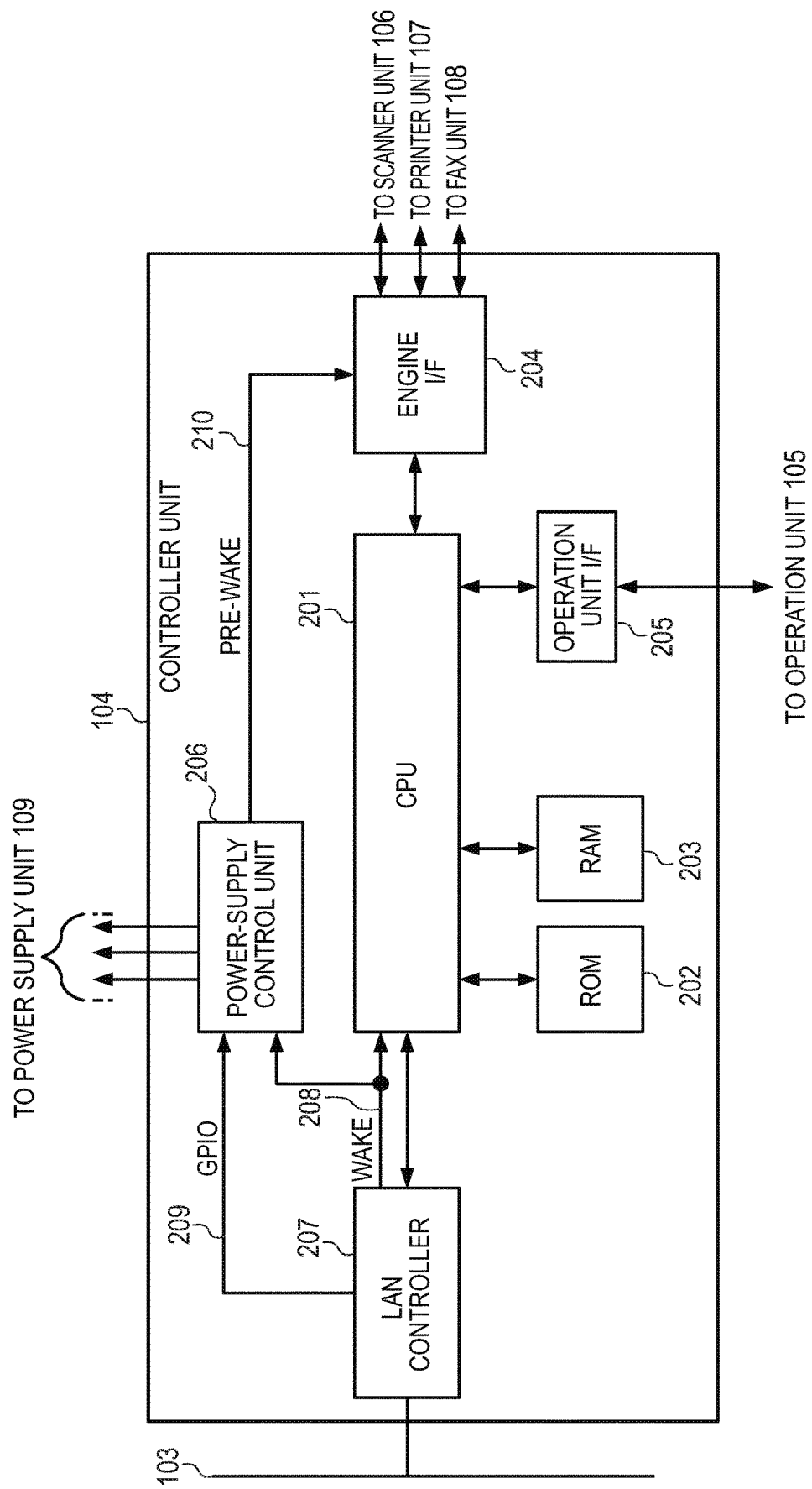
FIG. 2 is a block diagram illustrating an internal configuration of a controller unit according to a first embodiment.

FIG. 2 is a block diagram illustrating an internal configuration of the controller unit 104 in the image printing apparatus.

The controller unit 104 includes a CPU 201, a ROM 202, a RAM 203, an engine I/F (interface) 204, an operation unit I/F 205, a power-supply control unit 206 and a LAN controller 207.

The CPU 201 is connected to the engine I/F 204 and the LAN controller 207 through a PCI Express bus. The CPU 201 also includes a circuit for interfacing with various types of peripheral devices. The CPU 201 executes programs stored in the ROM 202 and functions as a control unit that generally controls the image printing apparatus 101.

The RAM 203 is used as work memory for the CPU 201. According to the mode such as copy, scan, print or fax mode, the RAM 203 stores data, such as image data, for the corresponding unit.

The engine I/F 204 is an interface connected to the scanner unit 106, the printer unit 107 and the fax unit 108. The engine I/F 204 performs communication control and an image data transmission/reception process.

The operation unit I/F 205 is an interface for connecting to the operation unit 105. The operation unit I/F 205 receives operation information entered through keys or a touch panel on the operation unit 105, and sends image data to be displayed on the operation unit 105.

The power-supply control unit 206 is a control unit that generates control timing signals for various power supplies. The power-supply control unit 206 controls ON/OFF of the various power supplies by sending the power-supply control timing signals to the power supply unit 109 and the engine I/F 204.

In the present embodiment, the power-supply control unit 206 can control power supplies for the engine I/F 204, the scanner unit 106, the printer unit 107 and the fax unit 108.

The image printing apparatus 101 can take at least two power states: normal mode and power-saving mode with less power consumption than in normal mode.

In normal mode, power is supplied to predetermined components in the image printing apparatus 101, including main units. In power-saving mode, the LAN controller 207 and the power-supply control unit 206 are powered and therefore operable. However, the other components including the engine I/F 204, the scanner unit 106, the printer unit 107, and the fax unit 108 are in a power-saving state with no or reduced power supplied, and therefore inoperative while waiting for an interrupt.

The LAN controller 207 is a control unit connected to the network 103 for communicating with the external apparatus via the network.

Upon receiving data via the network 103 in power-saving mode, the LAN controller 207 interprets the received data and determines whether the data requires activation of the CPU 201. If it is determined that the received data requires activation of the CPU 201, the LAN controller 207 asserts a WAKE signal 208, which is a control signal for the CPU 201 and the power-supply control unit 206.

The LAN controller 207 also sends a GPIO (General Purpose Input/Output) signal 209, which is a control signal for notifying the power-supply control unit 206 that the printer unit 107 is set to be activated in advance of activation of the CPU 201.

Details of these control signals sent by the LAN controller 207 will be described below.

Upon receiving the input of the WAKE signal, the power-supply control unit 206 sends a PRE-WAKE signal 210, which is a control signal regarding whether to power on the engine I/F 204 and the printer unit 107 in advance without waiting for a decision by the CPU 201.

Figure 10:
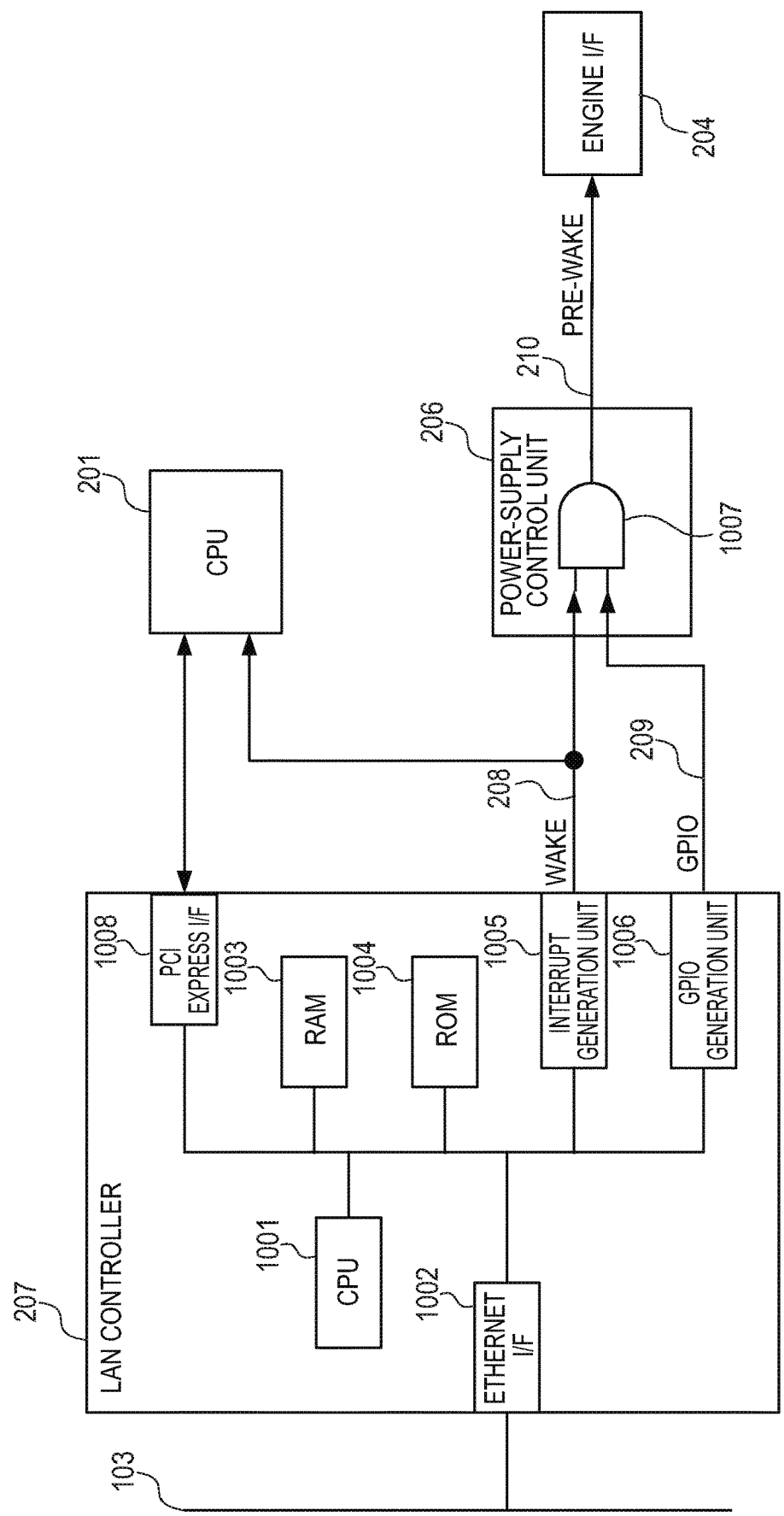
FIG. 10 is a block diagram of an internal configuration of a LAN controller and the power-supply control unit according to an embodiment.

FIG. 10 is a block diagram of an internal configuration of the LAN controller 207 and the power-supply control unit 206 in the present embodiment.

A CPU 1001 in the LAN controller 207 executes programs stored in a ROM 1004 and makes various settings of the LAN controller 207. The CPU 1001 also performs inter-CPU communication with the CPU 201 via a PCI Express I/F 1008, and transmits/receives, via an Ethernet I/F 1002, data to/from the external apparatus connected to the network 103.

A RAM 1003 is used as work memory for the CPU 1001.

The LAN controller 207 includes an interrupt generation unit 1005 for generating the WAKE signal 208, and a GPIO generation unit 1006 for generating the GPIO signal 209.

Now, internal operations performed when the LAN controller 207 receives data via the network 103 in power-saving mode will be described with reference to FIG. 10.

First, the LAN controller 207 determines whether the data received via the network 103 needs to be processed by activating the CPU 201.

If it is determined that the received data needs to be processed with the CPU 201, the LAN controller 207 controls the interrupt generation unit 1005 to assert the WAKE signal 208, thereby activating the CPU 201.

By contrast, if the received data can be responded to without the need of the CPU 201, the CPU 1001 in the LAN controller 207 responds to the data via the network 103.

Here, the process to be performed by activating the CPU 201 may be, for example, a process involving reference to a print job or to data stored in the image printing apparatus 101.

Second, if the LAN controller 207 determines that the received data requires activation of the CPU 201, the data may further be data that requires activation of the printer unit 107, such as print data. If so, in addition to controlling the interrupt generation unit 1005 to assert the WAKE signal 208, the LAN controller 207 controls the GPIO generation unit 1006 to turn on the GPIO signal 209, thereby notifying the power-supply control unit 206.

Here, the LAN controller 207 determines that the received data is print data if the destination port number of the data received from the external apparatus 102 is 9100 for an RAW protocol or 515 for an LPR protocol.

The power-supply control unit 206 has an AND gate 1007, and sends the PRE-WAKE signal 210 upon the assertion of the WAKE signal 208 after the GPIO signal 209 is turned on. The PRE-WAKE signal 210 is sent to the printer unit 107 via the engine I/F 204 to power on the printer unit 107 in advance, so that preparation operations such as the fuser temperature adjustment are performed before the start of printing.

Thus, in the first embodiment, if the data received by the LAN controller 207 via the network 103 in power-saving mode is print data, the printer unit 107 is powered on in advance. This advance power-on function will hereinafter be referred to as a "function of print-predictive return from sleep."

Normally, upon receiving data, the LAN controller 207 activates the CPU 201 with the WAKE signal 208. After the activation, the CPU 201 interprets the packet received via the LAN controller 207 and powers on the printer unit 107, which then returns to print mode.

Compared to the above, the use of the "function of print-predictive return from sleep" can shorten the FPOT period.

Figure 3A:
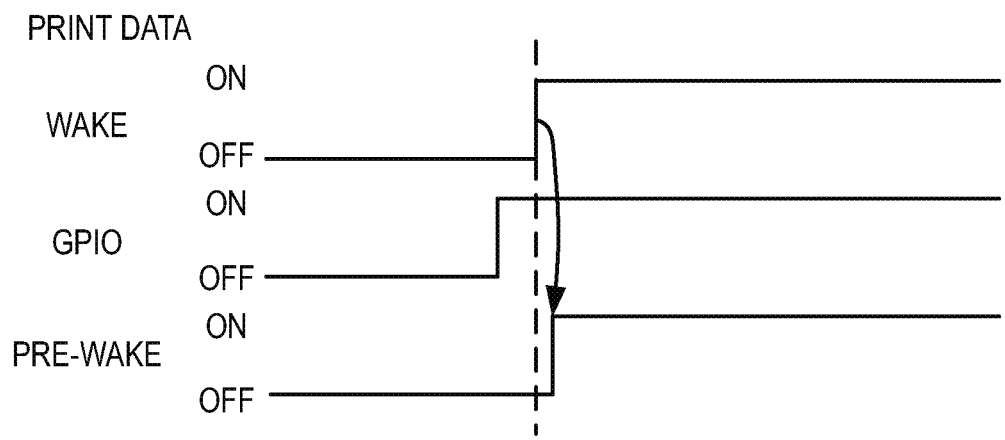
FIGS. 3A and 3B are timing charts of operations of a power-supply control unit according to an embodiment.
Figure 3B:
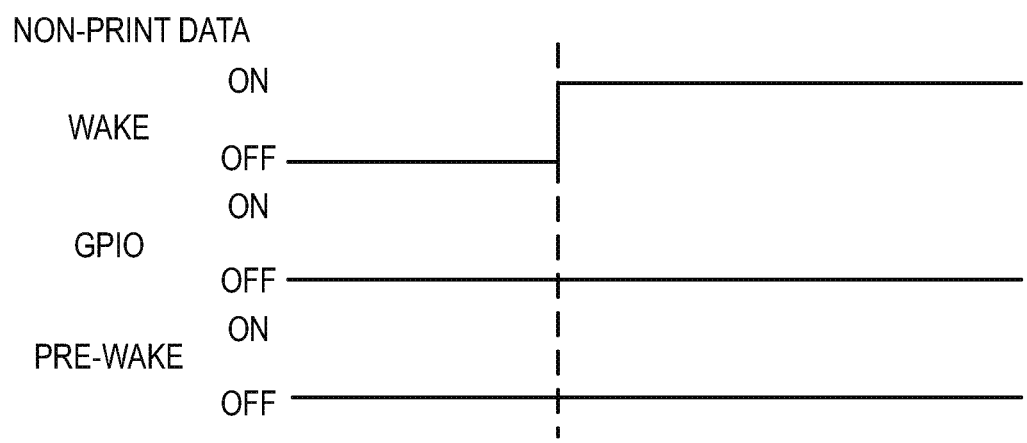

FIGS. 3A and 3B illustrate an example of timing charts of the operations of the power-supply control unit 206 in which the LAN controller 207 receives data via the network 103 in the first embodiment.

FIG. 3A is a timing chart in which the LAN controller 207 receives print data. FIG. 3B is a timing chart in which the received data is non-print data that requires activation of the CPU 201 (for example, an inquiry for information about the image printing apparatus).

If the data received by the LAN controller 207 is not print data, the GPIO signal 209 output by the LAN controller 207 is controlled to be turned off. Accordingly, the power-supply control unit 206 prevents the engine I/F 204 from being powered on. Thus, if the LAN controller 207 receives non-print data, the CPU 201 is activated but the engine I/F 204 remains powered off.

By contrast, if the received data is print data, the GPIO signal 209 is controlled to be turned on. Accordingly, the power-supply control unit 206 controls the PRE-WAKE signal 210 to power on the engine I/F 204. Thus, if the LAN controller 207 receives print data, the engine I/F 204 can be immediately powered on.

When an image printing apparatus is used in a network environment with a relatively low security strength, such as the Internet environment, a malicious user may continuously transmit data irrelevant to print data to the port 9100, which is a print port. In such a case, the printer unit 107 will be kept powered on despite the absence of a print request, resulting in wasteful power consumption.

Employing the configuration as in the first embodiment can prevent such wasteful power consumption.

Figure 4:
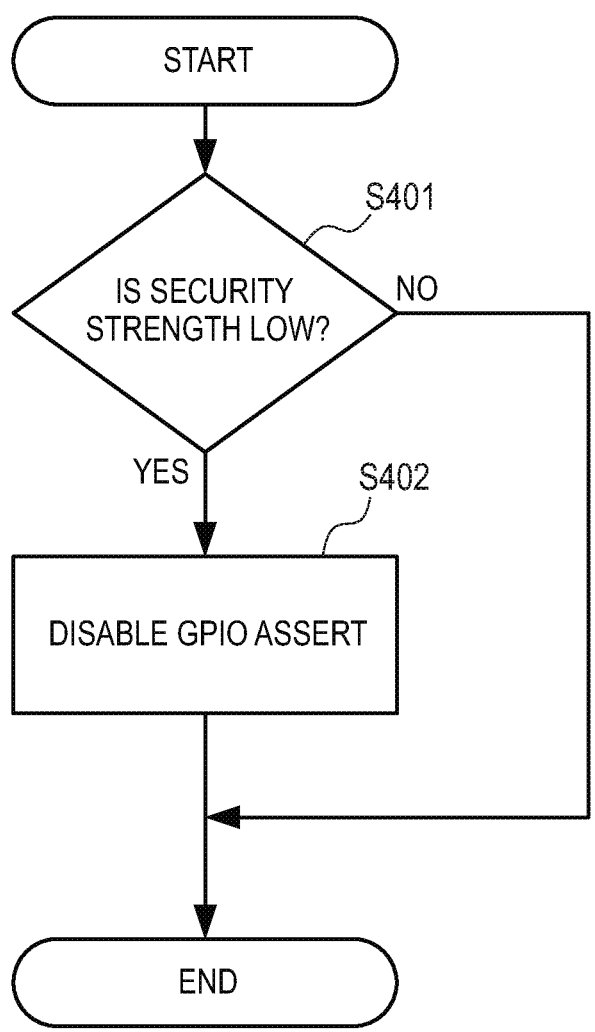
FIG. 4 illustrates a decision flow of checking for Internet connection by a CPU according to an embodiment.

FIG. 4 illustrates a decision flow of the CPU 201 in the present embodiment for avoiding wasteful power consumption caused by a malicious user's attack in an environment with a low security strength.

In S401, after start-up or in the standby state, the CPU 201 performs "security strength inspection" of the network to which the apparatus is connected via the LAN controller 207.

If it is determined that the security strength is low in S401, the CPU 201 transitions to S402.

In S402, for the LAN controller 207, the CPU 201 sets the GPIO assert setting of the "function of print-predictive return from sleep" to "disabled."

If it is not determined that the security strength is low in S401, the "function of print-predictive return from sleep" remains ON and the CPU 201 terminates the process.

The GPIO assert setting is a setting of enabling the GPIO generation unit 1006, which is done by the CPU 201 performing inter-CPU communication with the CPU 1001 in the LAN controller 207, according to the result of the "security strength inspection."

If the GPIO assert setting is set to "enabled", the "function of print-predictive return from sleep" is enabled. If the GPIO assert setting is set to "disabled", the "function of print-predictive return from sleep" is disabled.

As an example of the network environment with a low security strength, the first embodiment assumes an Internet-connected environment. Possible manners of determining whether the apparatus is connected to the Internet include the following examples.

Figure 11:
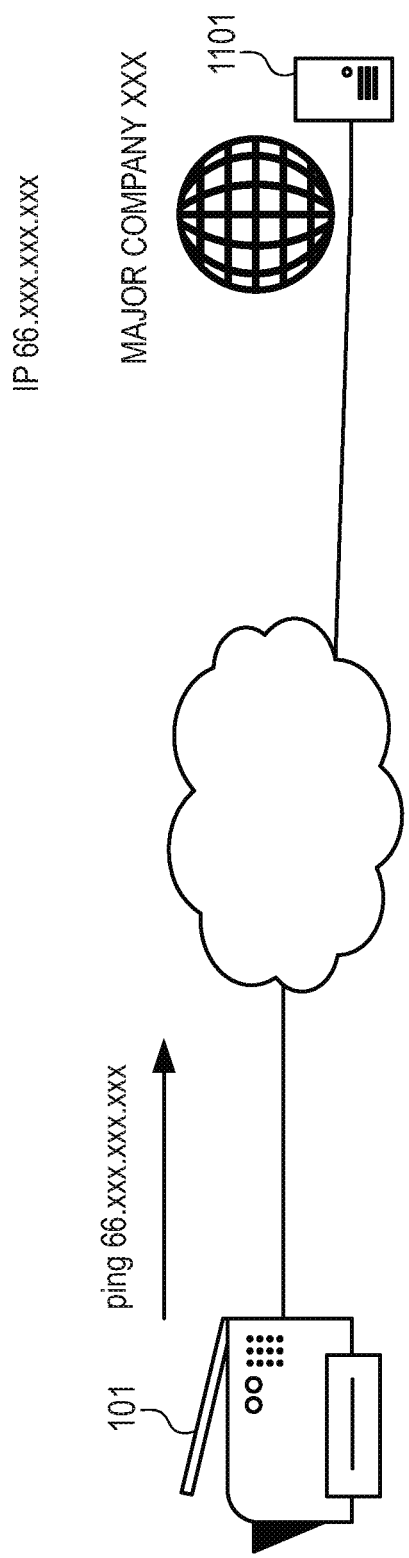
FIG. 11 illustrates a first example of determining the type of a network to which an image printing apparatus is connected according to an embodiment.

FIG. 11 illustrates a first example. Upon start-up or in the standby state, a connection test using, e.g., "ping" is performed against a server 1101 of a major vendor having a specific known IP address in the Internet.

If a response is returned as a result, it is determined that the apparatus is connected to the Internet; otherwise, it is determined that the apparatus is connected to an intranet.

Figure 12:
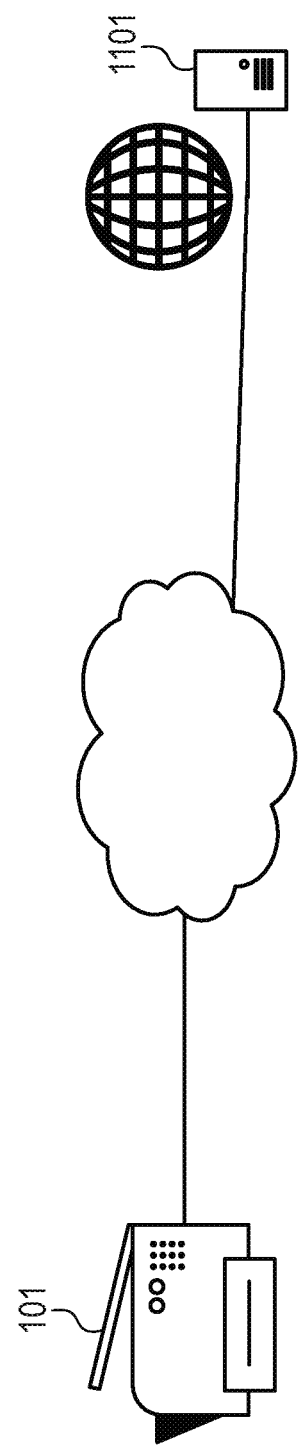
FIG. 12 illustrates a second example of determining the type of the network to which the image printing apparatus is connected according to an embodiment.

FIG. 12 illustrates a second example, in which it is checked whether the IP address of the image printing apparatus 101 is a global IP address.

If the IP address is a global IP address, it is determined that the apparatus is connected to the Internet; otherwise, it is determined that the apparatus is connected to an intranet.

In this case, the IP address "config" information about the image printing apparatus 101 is obtained upon power-on. If the IP address can be confirmed as a global IP address, it is determined that the apparatus is connected to the Internet. If the IP address cannot be confirmed as a global IP address or can be confirmed as a private IP address, it is determined that the apparatus is connected to the intranet.

For example, for IPv4, if any of IP addresses 10.xxx.xxx.xxx, 172.16.0.0 to 172.31.255.255, or 192.168.0.0 to 192.168.255.255 is set, the apparatus is connected to an intranet; otherwise, the apparatus is connected to the Internet.

Figure 13:
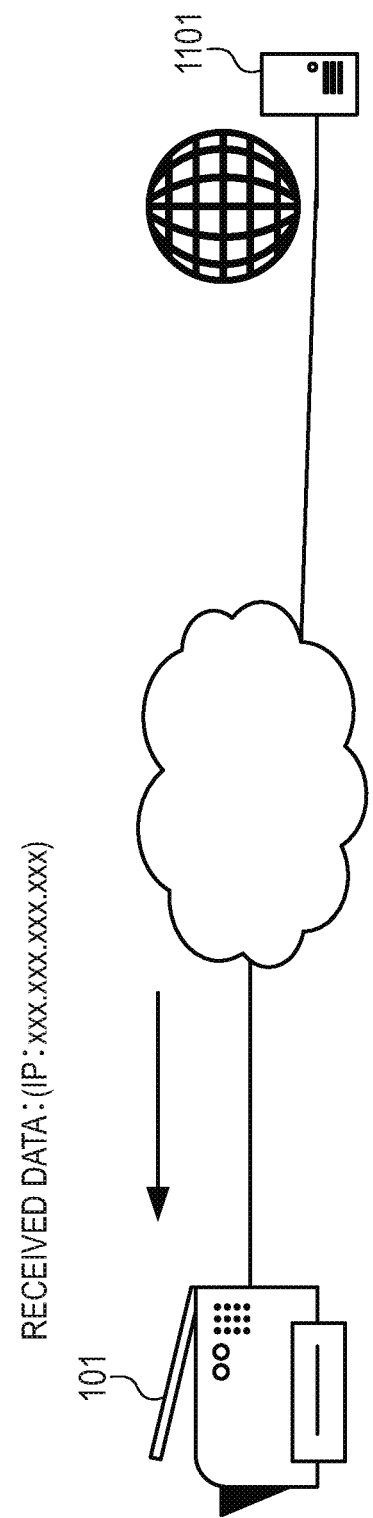
FIG. 13 illustrates a third example of determining the type of the network to which the image printing apparatus is connected according to an embodiment.

FIG. 13 illustrates a third example, in which the GPIO assert setting may be updated when the image printing apparatus 101 receives data.

In this case, it is determined whether the sender IP address included in the received data is a global IP address. If the sender IP address is a global IP address, it is determined that the apparatus is connected to the Internet. If the sender IP address is a private IP address, it is determined that the apparatus is connected to an intranet.

The GPIO assert setting in the LAN controller 207 is maintained after the image printing apparatus 101 enters the power-saving state. Therefore, upon reception of the data, it can be determined based on the GPIO assert setting whether generation of the GPIO signal by the LAN controller 207 should be enabled.

Here, Table 1 shows an example of GPIO signal outputs in the present embodiment.

TABLE 1

| | GPIO Assert Setting | Port Filter | GPIO Signal |
|---|---|---|---|
| 1 | enabled | print job (e.g., port 9100) | ON |
| 2 | enabled | non-print job | OFF |
| 3 | disabled | — | OFF |

As seen in Table 1, the advance power-on of the printer unit 107 is permitted only if the GPIO assert is enabled and the received data is a print job. If the GPIO assert is disabled, the GPIO signal remains OFF because port filtering is not performed.

As above, in the first embodiment, if the security strength is low, the "function of print-predictive return from sleep" is disabled. Then, after the CPU 201 is activated, the CPU 201 determines the type of the received data. This can prevent the image printing apparatus 101 from being activated to continue wasteful power consumption in the event of an access that is not a print job, such as an LPR port attack.

Second Embodiment

Figure 5:
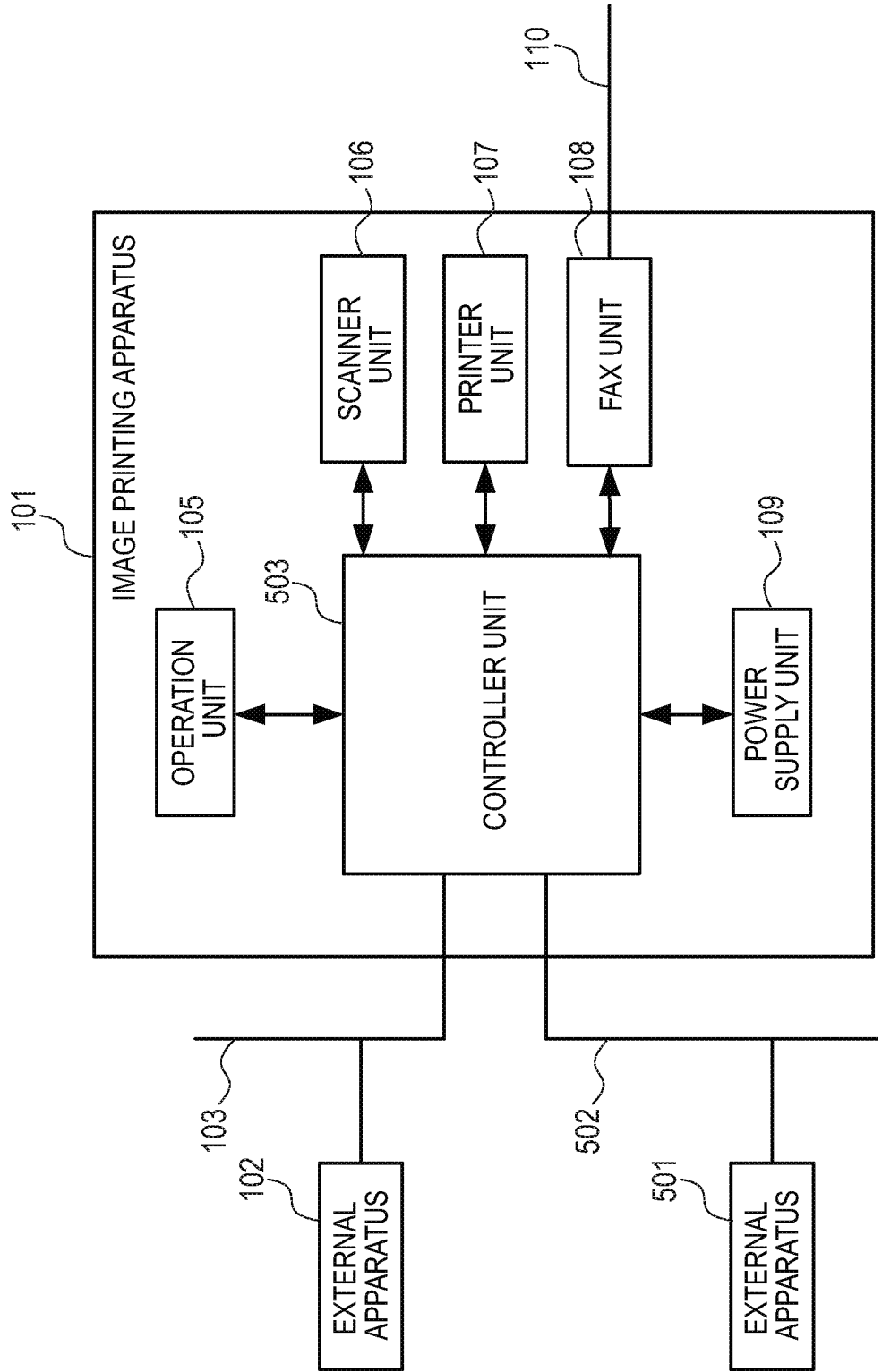
FIG. 5 is a diagram illustrating a configuration example of a printing system according to the second embodiment.

FIG. 5 illustrates a configuration example of a printing system in the second embodiment.

In FIG. 5, the image printing apparatus 101 is connected to the external apparatus 102 such as a PC via the network 103, as in the first embodiment. In addition, the image printing apparatus 101 is connected to an external apparatus 501 such as a PC via a network 502.

Figure 6:
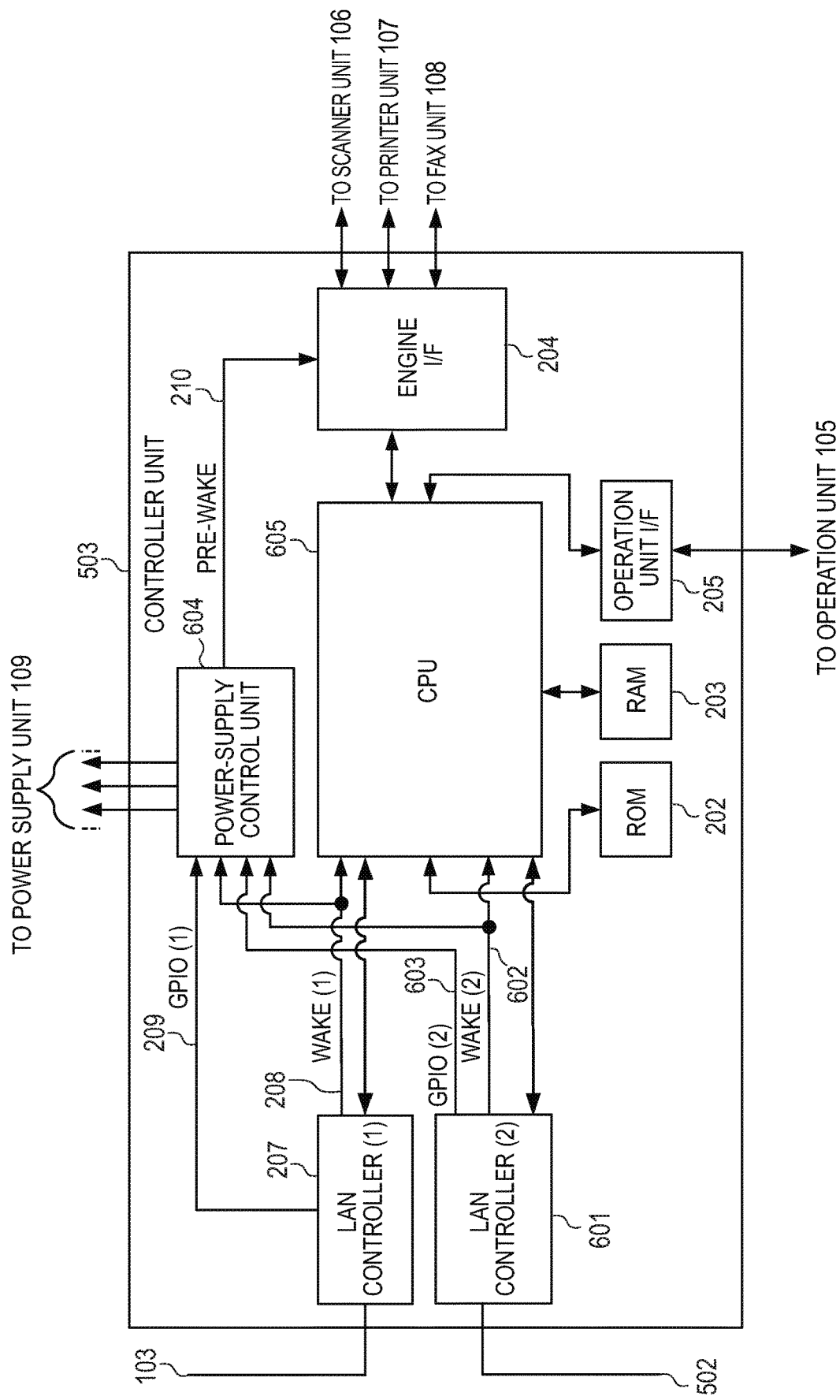
FIG. 6 is a block diagram illustrating an internal configuration of a controller unit according to the second embodiment.

FIG. 6 is a block diagram illustrating an internal configuration of a controller unit 503 in the image printing apparatus in the second embodiment.

The description of the basic internal configuration in the first embodiment illustrated in FIG. 2 applies to the second embodiment. The second embodiment differs from the first embodiment in that multiple LAN controllers are provided.

What are different from the first embodiment will be mainly described below.

The CPU 605 is connected, through a PCI Express bus, to the engine I/F 204 and two LAN controllers: the LAN controller (1) 207 and a LAN controller (2) 601.

The LAN controller (2) 601 is connected to a network (2) 502, which is different from the network (1) 103 to which the LAN controller (1) 207 is connected. The LAN controller (2) 601 may be configured to be optionally retrofitted to the controller unit.

As with the LAN controller 207, the LAN controller (2) 601 outputs a WAKE signal (2) 602 corresponding to the WAKE signal, and a GPIO signal (2) 603 corresponding to the GPIO signal.

Figure 7:
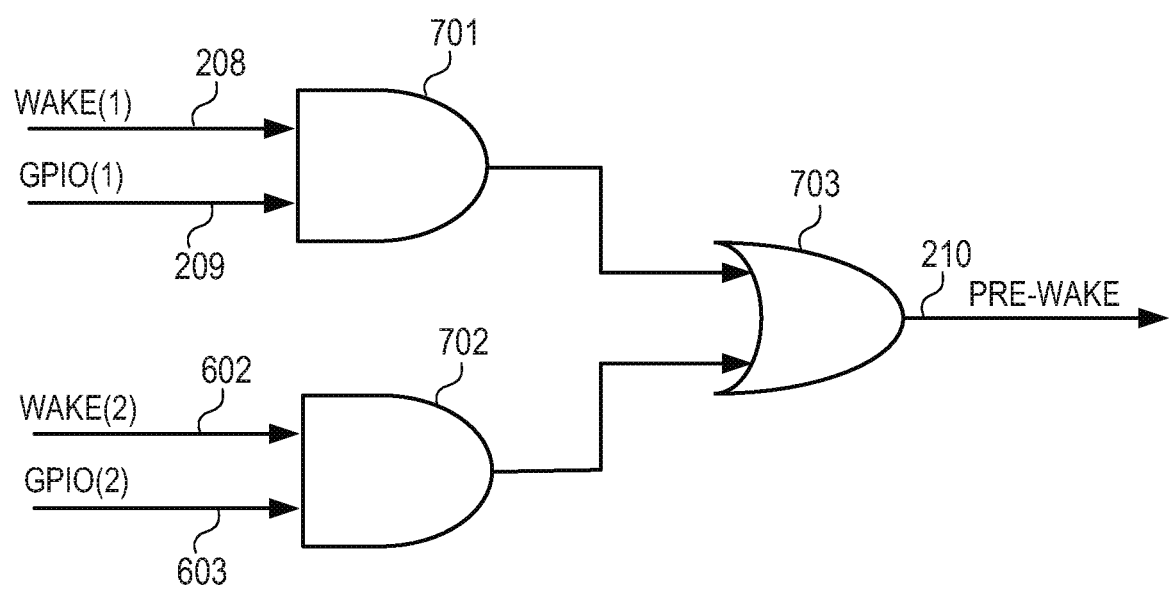
FIG. 7 is a block diagram illustrating an internal configuration of a power-supply control unit according to an embodiment.

FIG. 7 is a block diagram of the logic in the power-supply control unit 604 in the second embodiment.

The WAKE signal (1) 208 and the GPIO signal (1) 209 are input to an AND logic (1) 701 from the LAN controller 207.

The WAKE signal (2) 602 and the GPIO signal (2) 603 are input to an AND logic (2) 702 from the LAN controller (2) 601.

The output from the AND logic (1) 701 and the output from the AND logic (2) 702 are both input to an OR logic 703, which outputs the PRE-WAKE signal 210.

With the circuit illustrated in FIG. 7, the advance power-on can be set on a per-port basis, based on the GPIO signals (1) 209 and (2) 603 according to the GPIO assert settings made for the LAN controllers (1) 207 and (2) 601.

Figure 8:
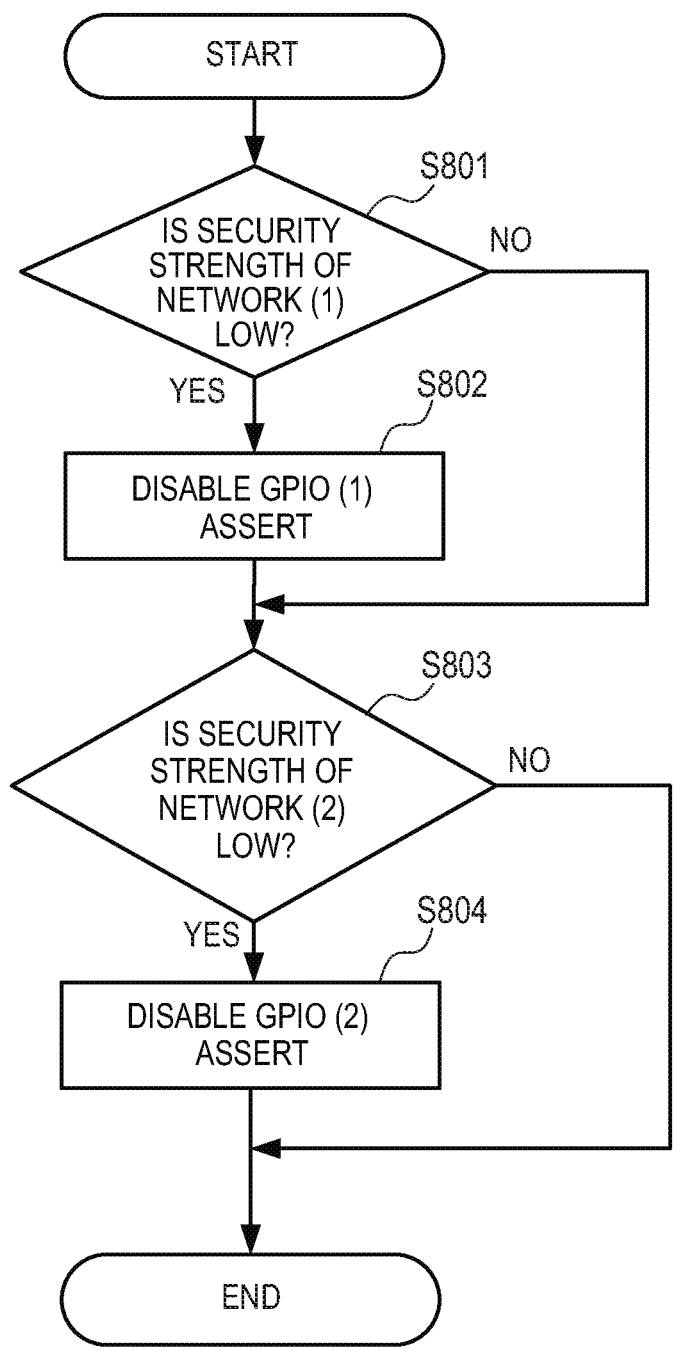
FIG. 8 is a decision flow of security strength inspection performed by a CPU according to an embodiment.

FIG. 8 illustrates a flowchart in which the CPU 605 performs the "security strength inspection."

In S801, after start-up or in the standby state, the CPU 605 performs the "security strength inspection" of the network (1) 103 to which the apparatus is connected via the LAN controller 207.

If it is determined in S801 that the security strength of the network (1) 103 is low, the CPU 605 transitions to S802.

In S802, the CPU 605 sets the GPIO (1) assert setting of the "function of print-predictive return from sleep" for the LAN controller 207 to "disabled."

If it is not determined in S801 that the security strength of the network (1) 103 is low, the CPU 605 leaves the "function of print-predictive return from sleep" for the LAN controller 207 ON and transitions to S803.

If the CPU 605 determines in S803 that the security strength of the network (2) 502 is low, the CPU 605 transitions to S804.

In S804, the CPU 605 sets the GPIO (2) assert setting of the "function of print-predictive return from sleep" for the LAN controller (2) 601 to "disabled."

If it is not determined in S803 that the security strength of the network (2) 502 is low, the CPU 605 leaves the "function of print-predictive return from sleep" for the LAN controller (2) 601 ON and terminates the flowchart.

Table 2 shows an example of GPIO signal outputs in the second embodiment.

TABLE 2

| | GPIO Assert Setting | Port Filter | GPIO Signal (1) | GPIO Signal (2) |
|---|---|---|---|---|
| LAN Controller (1) | enabled | print job (e.g., port 9100) | ON | — |
| | enabled | non-print job | OFF | — |
| | disabled | — | OFF | — |
| LAN Controller (2) | enabled | print job (e.g., port 9100) | — | ON |
| | enabled | non-print job | — | OFF |
| | disabled | — | — | OFF |

As above, in the second embodiment, the "function of print-predictive return from sleep" in the image printing apparatus having multiple network ports can be enabled or disabled according to the result of the security strength inspection of each network port. Therefore, security can be prioritized for a network with a low security strength, so that the image printing apparatus 101 can be prevented from being activated to continue wasteful power consumption in the event of an access that is not a print job, such as an LPR port attack.

By contrast, for data received via a network with a high security strength, FPOT can be prioritized to perform the advance power-on of the printer. Thus, security and performance can be balanced.

Third Embodiment

In the third embodiment, the configuration of the printing system and the internal configuration of the controller unit are the same as the second embodiment and therefore will not be described. The third embodiment differs from the second embodiment in that the security strength of each network can be set by a user.

Figure 9A:
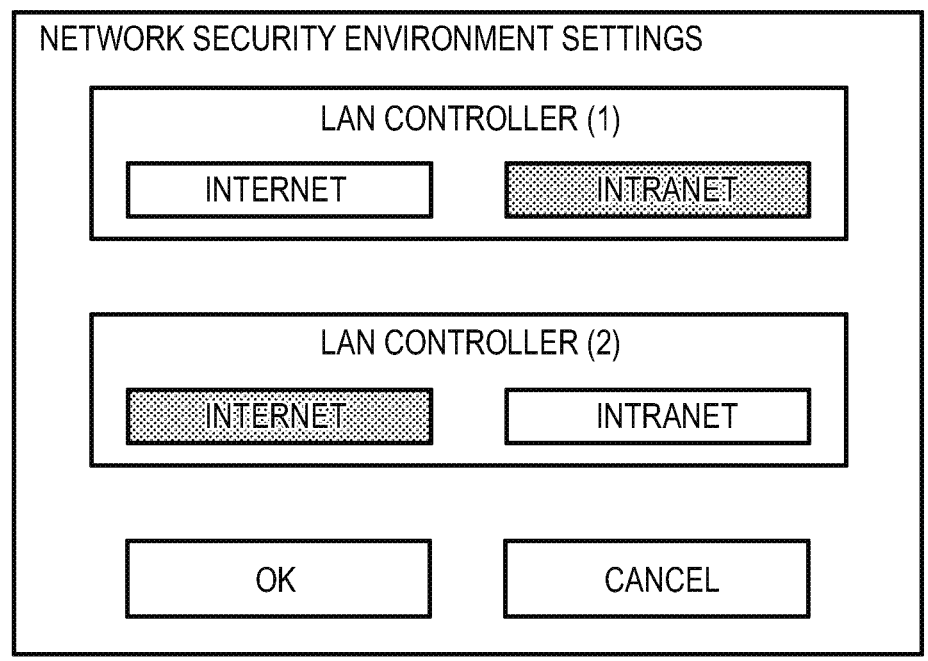
FIGS. 9A and 9B illustrate display examples on an operation unit according to an embodiment.

FIG. 9A illustrates an example of a screen of "network security environment settings" displayed on the operation unit 105 for a user to set network environments.

In the third embodiment, the user can individually set the two network environments controlled by the LAN controller (1) 207 and the LAN controller (2) 601, respectively. According to these settings, the CPU 605 determines the security strength of each network in the manner illustrated in the flowchart of FIG. 8 in the second embodiment.

In the third embodiment, it is determined that the security strength is low for the Internet, and high for an intranet.

Figure 9B:
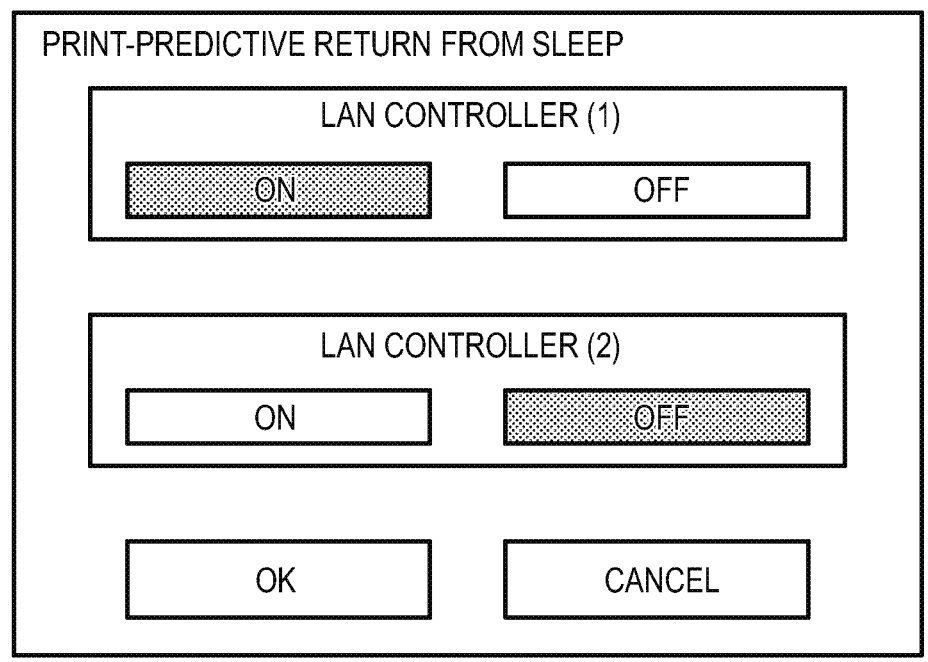

As illustrated in FIG. 9B, in the third embodiment, the user themselves may be able to set the "print-predictive return from sleep."

In the third embodiment, the user settings are reflected on the GPIO assert settings in Table 2.

For example, in the example illustrated in FIG. 9B, the "print-predictive return from sleep" is set to ON for the LAN controller (1) 207, and OFF for the LAN controller (2) 601.

In this case, the GPIO assert in Table 2 is set to "enabled" for the LAN controller (1) and "disabled" for the LAN controller (2). Accordingly, the GPIO signal (1) 209 depends on whether the received data is print data, whereas the GPIO signal (2) 603 is output in the OFF state irrespective of whether the received data is print data.

As above, in the third embodiment, the user can enable or disable the "function of print-predictive return from sleep" on a per-network-port basis in the image printing apparatus having multiple network ports. Therefore, the user can freely select prioritizing security or prioritizing FPOT according to the user's use environment.

Other Embodiments

Various embodiments of the present disclosure can also be realized by supplying a program implementing one or more of the functions of the above-described embodiments to a system or apparatus via a network or storage medium so that one or more processors in a computer of the system or apparatus read and execute the program. Various embodiments of the present disclosure can also be realized by a circuit (for example, an ASIC) implementing the one or more functions.

Various embodiments of the present disclosure can be applied to a system including multiple apparatuses or to a system embodied as a single apparatus.

The present disclosure is not limited to the above-described embodiments. Various modifications (including organic combinations of the embodiments) based on the spirit of the present disclosure are possible and not to be excluded from the scope of the present disclosure. Thus, the present disclosure encompasses all combinations of the above-described embodiments and their variations.

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While various embodiments have been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-103179, filed May 30, 2018, which is hereby incorporated by reference herein in its entirety.

What is claimed is:

1. An image forming apparatus comprising:
an image forming device that forms an image on a sheet;
a network interface; and
at least one controller configured to:
analyze data obtained via the network interface and, based on a result of the analysis, output an instruction to start power supply to the image forming device, and
set the network interface to a first mode based on a fact that it is designated that the network interface is connected to the Internet for use, and set the network interface to a second mode based on a fact that it is designated that the network interface is connected to an intranet for use,
wherein, the network interface outputs, in the second mode, a signal for starting power supply to the image forming device, in response to reception of data related to image forming, and does not output, in the first mode, the signal even if data related to image forming is received.

2. The image forming apparatus according to claim 1, further comprising a power control circuit that controls power supply to the image forming device,
wherein the network interface outputs, to the power control circuit, the signal for starting power supply to the image forming device.

3. The image forming apparatus according to claim 2, wherein, in response to the reception of the data related to image forming, the network interface outputs a signal for activating the power supply circuit.

4. The image forming apparatus according to claim 1, wherein, in response to the reception of the data related to image forming, the network interface outputs a signal for activating the controller.

5. The image forming apparatus according to claim 1, wherein the network interface processes, as the data related to image forming, data input via a port of a predetermined number.

6. The image forming apparatus according to claim 5, wherein the port of the predetermined number is a port used for an RAW protocol or a port used for an LPR protocol.

7. The image forming apparatus according to claim 2, wherein the signal for starting power supply to the image forming device is a GPIO signal.

8. The image forming apparatus according to claim 3, wherein the signal for activating the power control circuit is a WAKE signal.

9. The image forming apparatus according to claim 4, wherein the signal for activating the controller is a WAKE signal.

10. The image forming apparatus according to claim 1, wherein the controller determines that the network interface is connected to the Internet if the data obtained via the network interface includes a global IP address.

11. The image forming apparatus according to claim 1, wherein the controller determines that the network interface is connected to the Internet, based on a result of an attempt to access a predetermined server.

12. A method for controlling an image forming apparatus comprising:
an image forming device that forms an image on a sheet;
a network interface; and
at least one controller, the method comprising:
analyzing data obtained via the network interface and, based on a result of the analysis, outputting an instruction to start power supply to the image forming device, and
setting the network interface to a first mode based on a fact that it is designated that the network interface is connected to the Internet for use, and setting the network interface to a second mode based on a fact that it is designated that the network interface is connected to an intranet for use,
wherein, the network interface outputs, in the second mode, a signal for starting power supply to the image forming device, in response to reception of data related to image forming, and does not output, in the first mode, the signal even if data related to image forming is received.

* * * * *